United States Patent
Walker, Jr. et al.

(10) Patent No.: US 7,619,638 B2
(45) Date of Patent: Nov. 17, 2009

(54) CUSTOM COMPOSITE IMAGE SYSTEM AND METHOD

(75) Inventors: Kenneth A. Walker, Jr., Somerville, MA (US); Daniel R. Malone, Beverly, MA (US); Alexander K. Schowtka, Weston, MA (US)

(73) Assignee: Vista Print Technologies Limited, Hamilton (BM)

( * ) Notice: Subject to any disclaimer, the term of this patent is extended or adjusted under 35 U.S.C. 154(b) by 0 days.

(21) Appl. No.: 10/288,924

(22) Filed: Nov. 6, 2002

(65) Prior Publication Data

US 2004/0085330 A1   May 6, 2004

(51) Int. Cl.
*G09G 5/00*   (2006.01)
(52) U.S. Cl. .................. 345/629; 345/630; 345/634; 345/636; 705/26; 709/203; 715/243
(58) Field of Classification Search ............... 345/629, 345/630, 794, 797, 798
See application file for complete search history.

(56) References Cited

U.S. PATENT DOCUMENTS

| | | | |
|---|---|---|---|
| 5,880,740 A | 3/1999 | Halliday et al. | |
| 6,167,382 A * | 12/2000 | Sparks et al. | 705/26 |
| 6,310,627 B1 * | 10/2001 | Sakaguchi | 345/630 |
| 6,344,853 B1 | 2/2002 | Knight | |
| 6,826,727 B1 * | 11/2004 | Mohr et al. | 715/235 |
| 6,931,591 B1 * | 8/2005 | Brown et al. | 715/205 |
| 7,079,158 B2 * | 7/2006 | Lambertsen | 345/630 |
| 7,216,092 B1 * | 5/2007 | Weber et al. | 705/26 |
| 2002/0054115 A1 * | 5/2002 | Mack et al. | 345/765 |
| 2002/0062264 A1 * | 5/2002 | Knight | 705/26 |
| 2002/0118218 A1 | 8/2002 | Voticky et al. | |
| 2003/0055871 A1 * | 3/2003 | Roses | 709/203 |

FOREIGN PATENT DOCUMENTS

WO   WO 02/01507 A1   1/2002

OTHER PUBLICATIONS

PCT Search Report, Publication Date May 28, 2004, VistaPrint.

* cited by examiner

*Primary Examiner*—Antonio A Caschera
(74) *Attorney, Agent, or Firm*—Robert L. Dulaney; Jessica J. Costa

(57) ABSTRACT

A system and method for automatically generating composite images from component images selected by a system user and incorporating the composite images into an image of a custom product. The user can select component images in any sequence and can delete, add, replace or change component images and colors during the design process. The library of component images is organized into categories and subcategories for presentation to the user.

32 Claims, 4 Drawing Sheets

CUSTOM COMPOSITE IMAGE SYSTEM AND METHOD

FIELD OF THE INVENTION

The invention relates to an automated system and method for the creation of composite images for incorporation into a customized product design.

BACKGROUND OF THE INVENTION

The widespread availability of the World Wide Web and related data processing and communication technologies have created new ways for businesses to market their products and services to their customers. Among the many new businesses that have taken advantage of the capabilities of the Web are printing service providers. Typically, these companies allow customers to access the printing service provider's web site, input customer information or other content, and place an order for custom printed products such as documents, clothing, and promotional goods. Systems that allow a client to access a printing service provider's web site, download a product template, create a customized product, and display an image of the final product to the customer are known in the prior art.

One network-based product design system is disclosed in U.S. Pat. No. 6,247,011 entitled "Computerized Prepress". The patent discloses a document authoring tool that is downloaded from a server and runs in the client browser. The product created by the client is uploaded to the server where it is processed by a translation program into a prepress file format. Another system is disclosed in co-owned U.S. Pat. No. 6,650,433, issued Nov 8, 2003 and entitled "Managing Print Jobs", which is hereby incorporated by reference. The system discloses a downloadable editing tool that allows a customer to create and edit materials in the customer's browser. The system makes a number of pre-designed product templates available for customer viewing, downloading, and customizing.

These prior art capabilities are, however, limited in some regards. In the prior art, the ability to create an image of a customized product that depicts the ultimate appearance of the product and can be previewed by the client during the design process is generally limited to (a) the entry, modification and positioning of the client's custom text, (b) the selection of an image from a library of pre-designed images provided by the service provider, and/or (c) the uploading and incorporation of a pre-existing client image. Known prior art systems do not provide the capability to take various separate component images and colors selected by a client and combine them automatically into one or more integrated component images that are then incorporated into the product image being viewed by the client during the product design process.

For example, a Web-based enterprise operating as CustomInk.com allows a client to select and view a photographic image of a product such as an item of clothing, a tote bag, a mouse pad, or a cap. The system provides the ability for the client to enter, modify and position text within a predetermined area on the photographic image. The system also provides the ability for the client to upload a client image file or to select from a library of pre-designed images provided by the service. The color of the pre-designed image can be selected from a palette of available colors and, in general, the pre-designed images can be positioned and resized. This prior art system does not provide a means for the generation of integrated composite images from image components.

In the particular field of custom return address labels, an example of a prior art system is the Web-based enterprise operating as FamilyLabels.com. Users of this service select one or more completed head designs from a library of pre-designed heads for people and animals. The user then selects a desired skin color and selects any desired additional features for each head, such as glasses and facial hair, by marking desired items on an accompanying list of available colors and features. A notice on this Web site states that this system is not able to show a composite image for previewing. The user of this prior art system must place an order for the product without having been able to view an on-screen image of the final product design.

SUMMARY OF THE INVENTION

The present invention addresses these and other shortcomings in the prior art by providing a system and method that automatically assembles one or more composite images from component images and component colors selected by the user and incorporates the composite images into an image of a custom product. A library of component images is organized into categories and subcategories for easy searching by the user. The user can modify a composite image by deleting a component image, adding an additional component image, replacing one component image with another image, or by changing the color of an individual component. The colors used for the component images are separately selected.

DESCRIPTION OF THE PREFERRED EMBODIMENT

Figure 1:
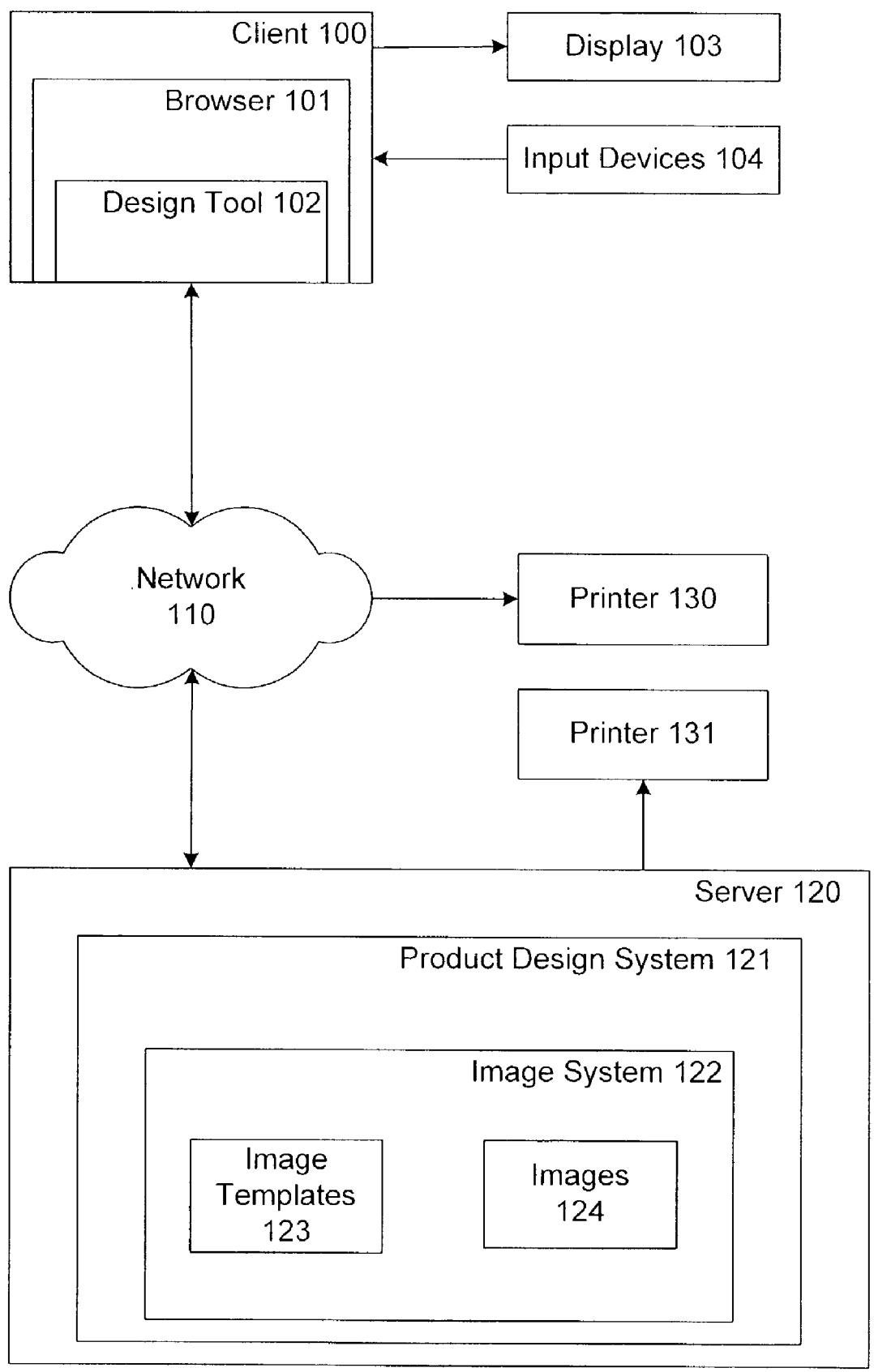
FIG. 1 is a diagram of a client/server system with which the invention may be employed.

FIG. 1 shows a client/server system with which the invention may be employed. In a preferred embodiment, client 100 is a personal computer equipped with the usual complement of features and peripherals, including display device 103 and input devices 104, including a keyboard and a mouse. Client 100 is running browser program 101, such as Microsoft Explorer from Microsoft Corporation or Netscape from Netscape Communications. Client 100 could be any device, such as a portable computer, tablet computer or Web-enabled telephone, that is capable of running browser software and supporting communication with server 120. Client 100 communicates with server 120 via network 110. Network 110 is preferably the World Wide Web, but could be any intranet, extranet, or other network.

Server 120 is a computer system having a universal resource locator and adapted to be accessed by geographically dispersed clients over network 110. While shown in FIG. 1 as a single unit, it will be understood that server 120 may be comprised of a plurality of individual processors or computers, data storage units, and other equipment, which may be either in the same or in different geographical locations, operating cooperatively so as to support a commercial Web-based enterprise and to provide associated computational, informational, and electronic commerce support to the enterprise's customers. Server 120 is running product design system 121. In a preferred embodiment system 121 allows the user of client 100 to design a variety of custom products for subsequent printing. Upon completion of the order and satisfaction of all other conditions, such as receipt of payment and availability of the printing system, product design system 121 will either produce the customer's product locally on printer 131 or transmit the product design over network 110 to remote printer 130 for production. Alternatively, product design system 121 could make the electronic product image available to client 100 and leave the arrangements for the actual production of the finished product to the client.

When server 120 is initially accessed by client 100, the client is provided with the system 121 home page. The home page provides information about the products and services offered by product design system 121 and provides various links by which the user may navigate to other portions of the site. The design and operation of electronic commerce Web sites and the processes and techniques for exchanging commands and data between a client and a server are well known in the art. In a preferred embodiment, the products offered by system 121 include, for example, business cards, postcards, letterhead, brochures, and return address labels (RALs).

As mentioned above, client/server systems providing a client with the ability to design custom documents for subsequent printing are known in the art. The present invention described below relates to a novel capability suitable for incorporation into such a product design system. The capability allows the user to create one or more custom composite images and incorporate those images into the product being developed. As will be clear from the following discussion, in its broadest application, the invention relates to the system and method for creating the custom image regardless of the print medium or, indeed, regardless of whether the image is intended for printing at all, such as an image created for use as a screensaver, an e-mail attachment, or other electronic use. The invention will be described in the context of an embodiment of the invention for designing custom content for a RAL. It will be clear from the following disclosure that the invention is not so limited.

For a user who desires to create a custom RAL, system 121 offers two RAL design options. The first option, known in the prior art, provides the user with a plurality of pre-designed RAL templates from which the user can choose. The templates include various colors, photographs, drawings, and/or graphics intended to make the RAL templates interesting and attractive. When the user selects one of the RAL designs, the RAL template is displayed along with data entry fields where the user can enter the user's custom name and address information. The user has the option of either using the pre-designed template as supplied by system 121 or uploading a pre-existing image file from a client 100 internal storage device, or another storage device that is accessible to client 100, for incorporation into the product being designed.

The second RAL option, which incorporates the invention that is the subject of this application, allows the user to create one or more custom composite images for incorporation into the RAL. The design of these custom composite images is supported by image system 122. Image templates 123 contains pre-designed custom image product templates. Images 124 contains various pre-designed component images from which the user may select to construct a custom image for incorporation into the user's custom product.

In the application of the invention discussed below, the system provides the means for the user to select various component images of human heads that the system will automatically combine into a single composite head image for incorporation into the product design. The components are considered as being divided into four broad categories: faces, facial hair, hairstyles, and accessories, such as glasses, hats, and earrings. To allow the user to quickly focus on relevant choices, these broad categories, with the exception of facial hair, are further divided into subcategories. For example, the category of hair is divided for presentation into the subcategories of male hairstyles, female hairstyles, and children's hairstyles. Each subcategory is associated with a set of related images in images 124. For example, the subcategory of male hairstyles includes a selection of images depicting various male hairlines, hair of various lengths and thicknesses, and so forth. These, and all other component images, are retained in images 124 in black-and-white. The colors of the hair and other component images are selected by the user independently. In a preferred embodiment, the images available in images 124 are relatively simple drawings in the general nature of caricatures or cartoons. The images are not detailed and do not represent any specific individual. They are intended to be generalized facial and hairstyle types which the user can combine together along with selected skin and hair colors, facial hair, glasses, and other appropriate accessories to create an image that has general appearance attributes in common with an individual known to the user.

In a preferred embodiment, images 124 are stored and manipulated as VML (Vector Markup Language) objects. VML is a well-known application of XML (Extensible Markup Language) that is specifically intended to provide a format for combining vector information defining a shape, or group of shapes, along with markup information describing how the vector information may be displayed and edited. VML supports grouping of multiple VML shape elements into a consolidated group that can be positioned, transformed and rendered as a single unit. VML also allows the VML shape and the associated fill color for the shape to be separately stored and manipulated. Other languages known in-the art could be employed.

Figure 2:
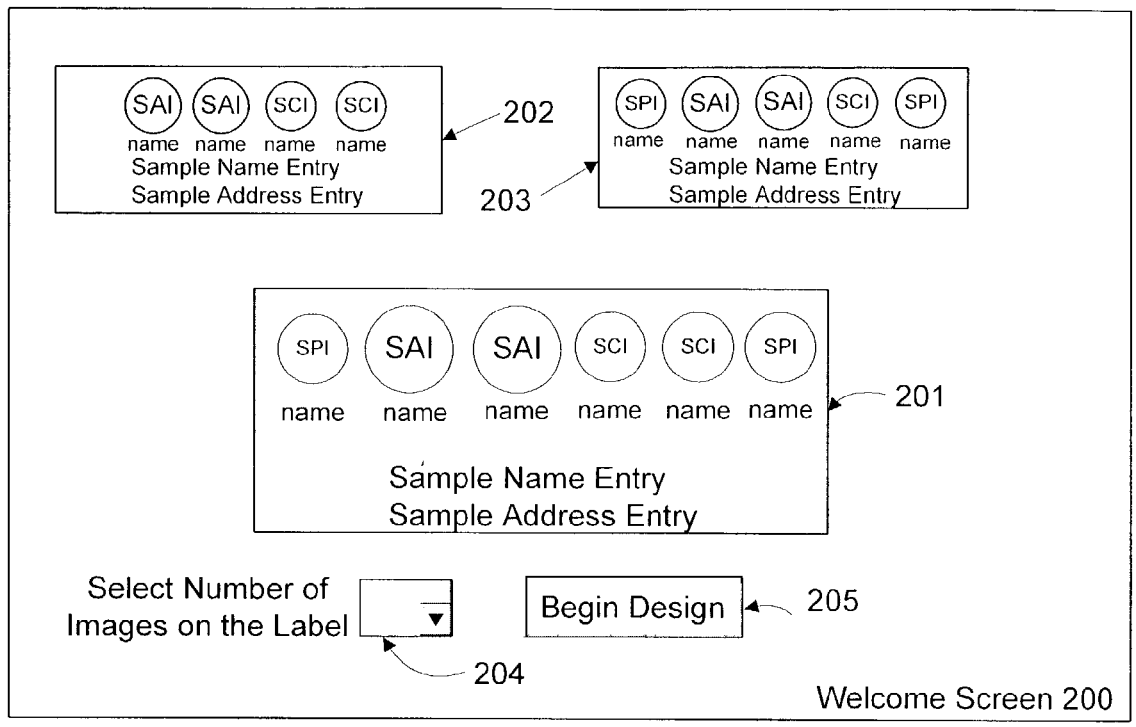
FIG. 2 is a representation of an initial product screen.

When a user selects the option of designing a custom composite image, image system 122 is activated and welcome screen 200 is sent to client 100. Referring to FIG. 2, in a preferred embodiment, welcome screen 200 contains a number of sample pre-designed RAL designs 201-203 to give the user an indication of the types of images and labels that can be created with the system. More, fewer, or different samples could be used. Each sample RAL contains sample adult, child and pet images, indicated in FIG. 2 by SAI, SCI and SPI, in various arrangements.

When the user is ready to initiate the design of a custom RAL, the user selects the desired number of custom images using menu 204. Because a standard RAL is fairly small, typically being approximately 2 inches in width and less than one inch in height, menu 204 in a preferred embodiment allows the user to choose from 1 to 7 custom label images. In other applications where more space is available, a greater number of custom images could be allowed. When the desired number of images has been selected, the user initiates the RAL design process by clicking begin design button 205.

In the embodiment discussed herein, image templates 123 contains a single template for each selected number of custom images. In response to begin design button 205, server 120 will retrieve the appropriate template from image templates 123 and prepare the appropriate template creation screen 300 for forwarding to client 100. As an alternative embodiment, image templates 123 could contain a variety of templates for each number of custom images. The templates could offer the user a choice of various background colors, images or graphics, and various layouts, for example with the custom images below, to the right, or to the left of the name and address information. In this alternate embodiment, instead of proceeding directly to template creation screen 300, the user's clicking of begin design 205 would cause server 120 to first provide a further selection screen presenting images of the various layouts or background images from which the user could select the specific background or layout desired.

Figure 3:
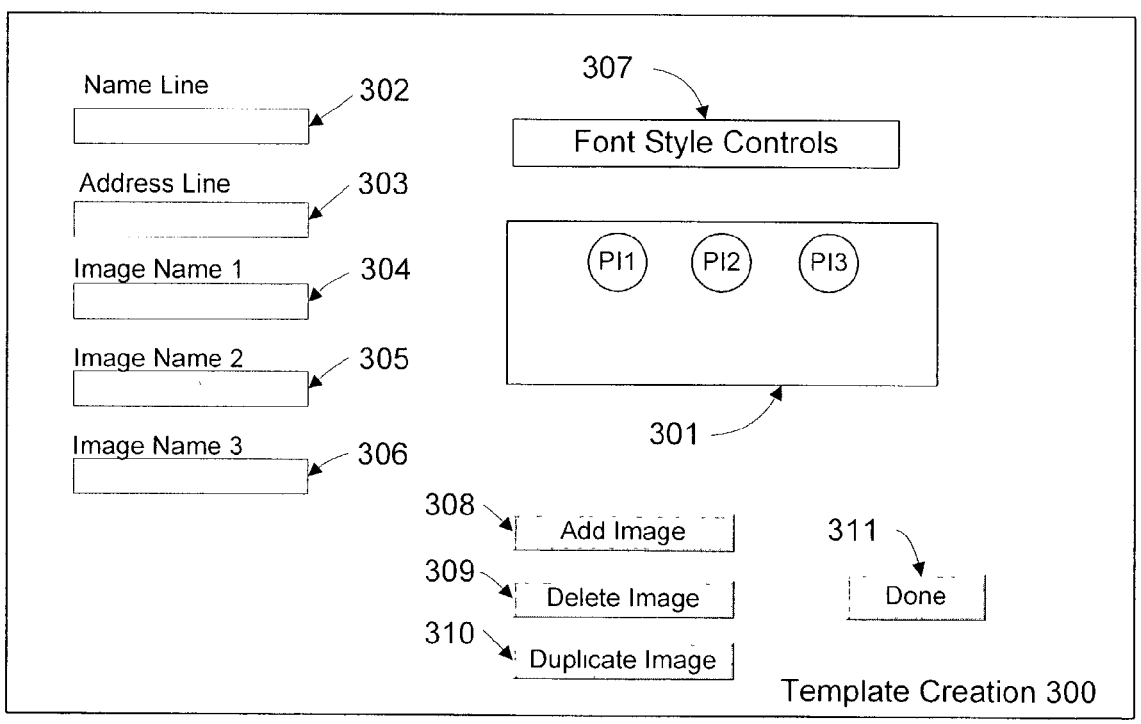
FIG. 3 is a representation of a product template creation screen.

For the purpose of illustrating the invention, the following example will discuss a user who desires to create an RAL with three custom images. The user is presented with template creation screen 300 as represented in FIG. 3. RAL template 301 is initially empty except for the three generic placeholder images, represented as PI1, PI2 and PI3, to indicate the location where the custom images will appear. Template creation screen 300 includes name field 302, address field 303 and a number of image name fields equal to the number of custom images selected. In this example, because the user has chosen a label with three custom images, the screen presents three image name fields 304-306 where the user may, if desired, enter names to appear under each custom image.

The user can choose to approach the design of the label in any sequence desired. That is, the user can customize the three images in any order and can enter the text information at any time during the design process. The text fields are optional, therefore the user can choose to leave any one or more blank, if desired. Preferably, as the client enters text in the fields 302-306, the text is rendered by design tool 102 in template 301 at the appropriate location. To give the user the ability to customize the appearance of the text, font style controls 307 is provided. Font style controls 307 includes buttons and menus (not shown) to allow the user to perform typical font-related actions, such as causing the text to appear in italics or in bold, changing the size and color of the font, and selecting a different font from a menu of available fonts. The implementation and use of such menus and controls are well understood in the art. Design tool 102 will display the user's text in a WYSIWYG fashion that represents the appearance of the final product. If the user is not satisfied with the appearance or content of the text, the user can repetitively modify the text in fields 302-306 and use font style controls 307 until the text content and appearance is as desired.

As mentioned above, the basic variable components made available to the user in constructing a custom image of a head are faces, facial hair, hair, and accessories. The facial images in images 124 are complete faces that include eyes, ears, nose and mouth. As an alternate embodiment, the user could be given more design control over the face by supplying individual images in images 124 for some or all of these various facial components and allowing the user to combine individually selected eyes, ears, and so forth into a composite facial image.

Figure 4:
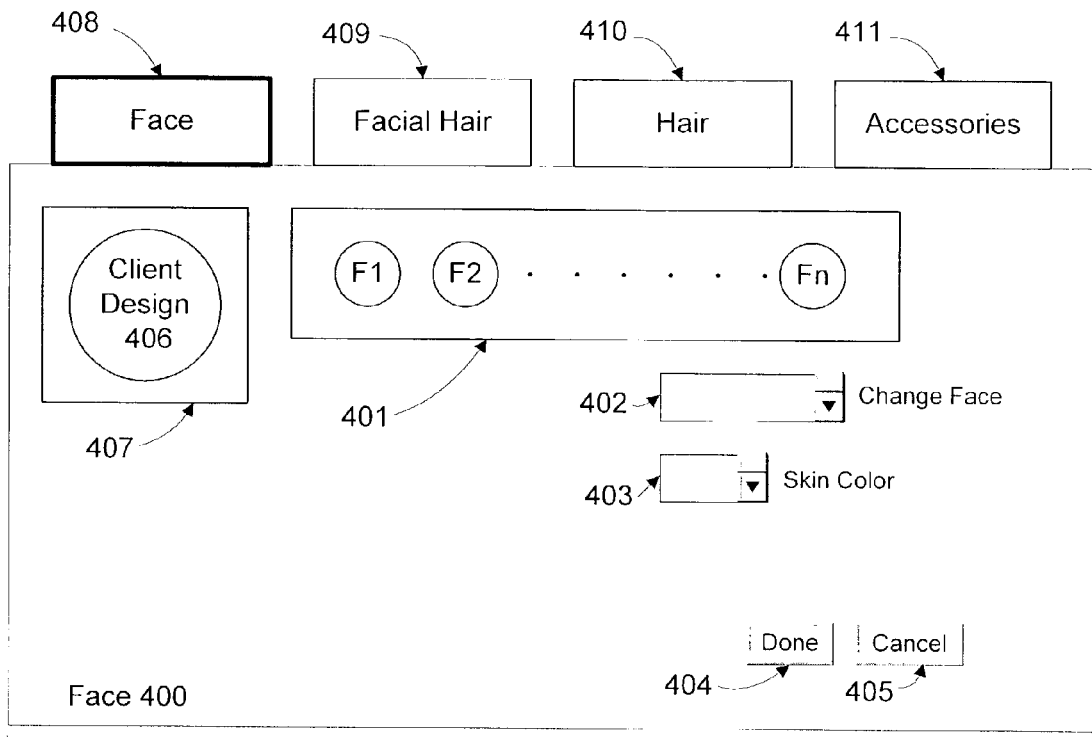
FIG. 4 is a representation of a first custom image creation screen.

Referring now to FIGS. 4-7, an illustrative example of the operation of the system will be discussed. It will be understood that the system is intended to be highly flexible with many options. The particular component images selected for a custom image and the particular sequence of design actions are under the control of the user. To begin the individual custom image creation process, the user selects one of the three placeholder image choices PI1, PI2 or PI3 in template 301, typically using the user's mouse. Upon selecting a placeholder image, design tool 102 notifies server 120 and server 120 returns an initial design screen to client 100. In a preferred embodiment, because most users will want to begin the image process by selecting a face, the user is initially presented with face screen 400, as depicted in FIG. 4. As a default, screen 400 is initially presented in male face selection mode. A number of choices in male faces, indicated by F1-Fn, are displayed in options window 401. The F1-Fn images preferably have no hair. Hair, if desired, is selected on a separate screen.

The system does not force the user to proceed in a set sequence. The four main categories of design components each have their own design screen. Navigational among the four main screens is controlled by the user's selection of one of the four tabs 408-411. These tabs allow the user to move among the four main editing screens in any order the user desires. The four component image design screens 400, 500, 600 and 700 all have a similar layout, but vary in the images displayed in window 401 and the available selection menus associated with the screen.

Continuing to refer to FIG. 4, if the user does not wish to begin with a male face, the user can use menu 402 to request female faces or children's faces. To accommodate users who may want to incorporate an image of a pet or other animal into their RAL, menu 402 also includes an option to view images of various animals. In a preferred embodiment, the library of component images is maintained in images 124 at server 120. If the user selects a different face type, server 120 will assemble the appropriate set of images from Images 124 and forward the set of images to design tool 102 to be displayed in options window 401. The male face images F1-Fn that were initially presented in window 401 will be replaced with a different set of images of the new face type selected.

When a new custom image design session is initiated, window 407 is empty when screen 400 is initially displayed to the user. During the design session, the current state of the custom image being designed by the user, indicated in FIGS. 4-7 as client design 406, will be displayed for review by the user in window 407. Client design 406 will be a composite image reflecting the current combination of the image and color choices made by the user during the session. When any image component is selected by the user from window 401, that component will be incorporated into window 407. For example, if the user were to select the F1 image in window 401 of FIG. 4, the F1 image would appear in design window 407 with a default skin color. The desired skin color for the face may then be selected by the user from skin color menu 403. When a new skin color is selected, client design 406 will be updated to reflect the chosen color. If the user decides to try a different image, the user simply clicks on the new image in options window 401 and the new image will replace the previous image in window 407. The substitute image will retain the same color as the image it replaced.

Figure 5:
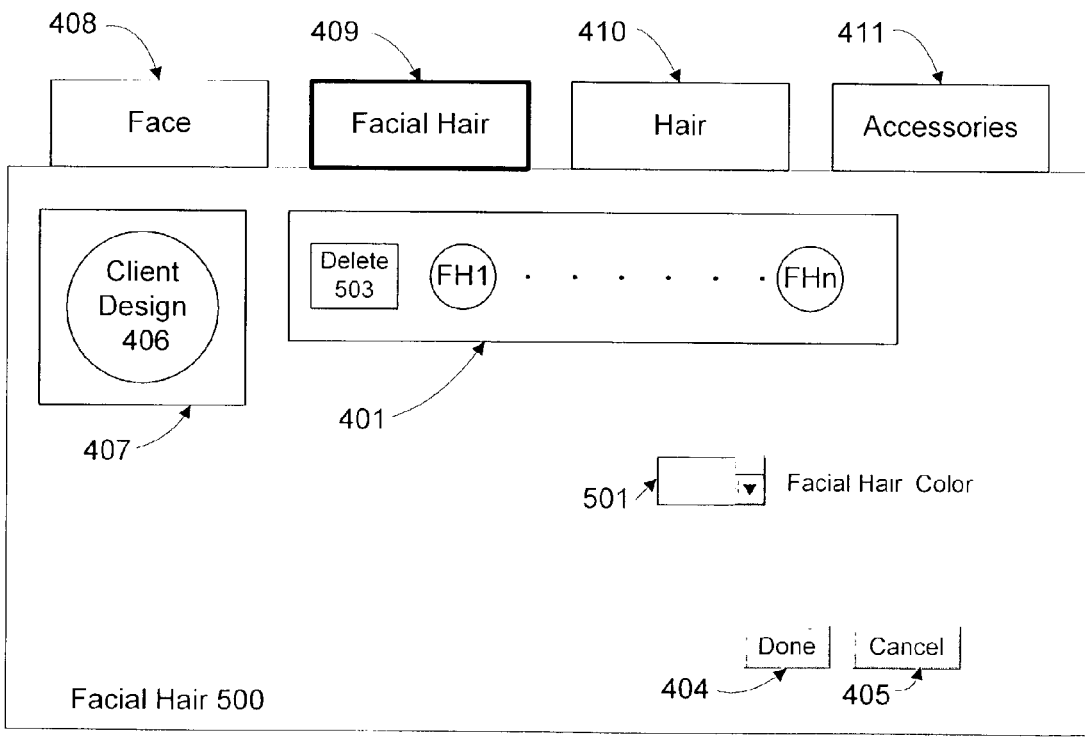
FIG. 5 is a representation of a second custom image creation screen.

When the user selects tab 409, facial hair screen 500 is displayed, as represented in FIG. 5. Window 401 of screen 500 includes images FH1-FHn, typically depicting various mustaches, beards, and goatees. If the user selects one of the facial hair images, the selected image will be incorporated into the composite client design 406. The color of any selected facial hair is controlled by facial hair color menu 501. Options window 401 of screen 500 also includes an image, represented as delete 503, that allows the user to remove any previously selected facial hair image from client design 406.

Figure 6:
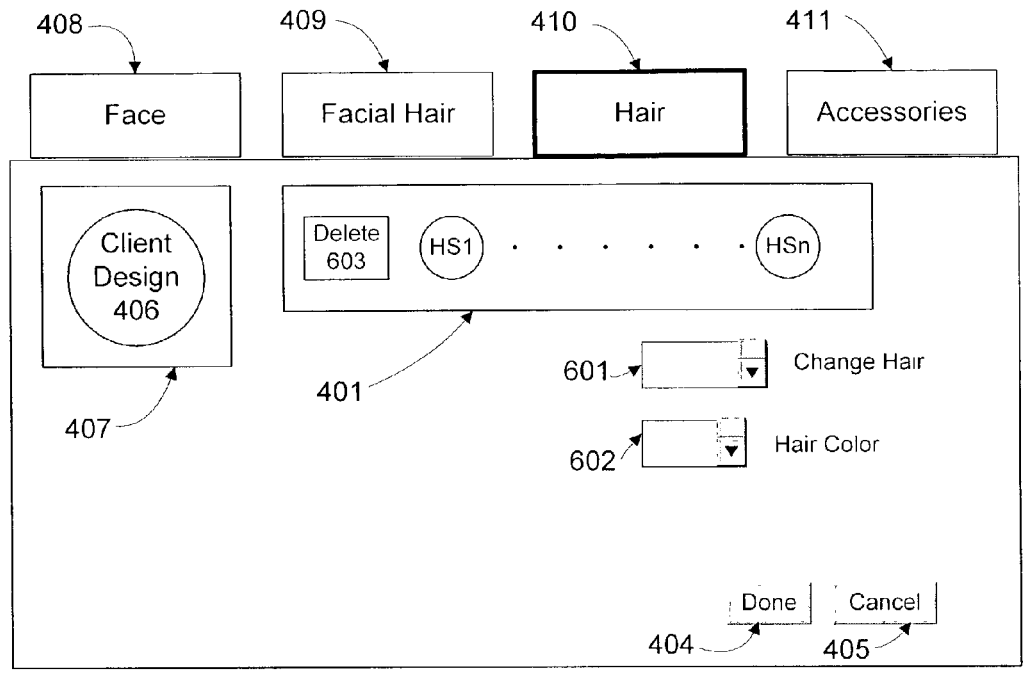
FIG. 6 is a representation of a third custom image creation screen.

When the user selects tab 410, hair screen 600 is displayed, as represented in FIG. 6. Hair editing opens, by default, with male hairstyles. A selection of male hairstyles HS1-HSn is presented in options window 401. Hairstyles for females and children can be requested by selecting the desired hairstyle type from menu 601. When the user selects a desired hairstyle, the selected image is incorporated into composite client design 406 and displayed in window 407. If the client desires to change to a different hair design, the user selects a desired new style from window 401. Client design 406 will be automatically updated to reflect the newly selected style. If, the user wishes to completely remove any hairstyle, the user can select the delete image 603 in window 401. Hair color is selected using hair color menu 602.

Figure 7:
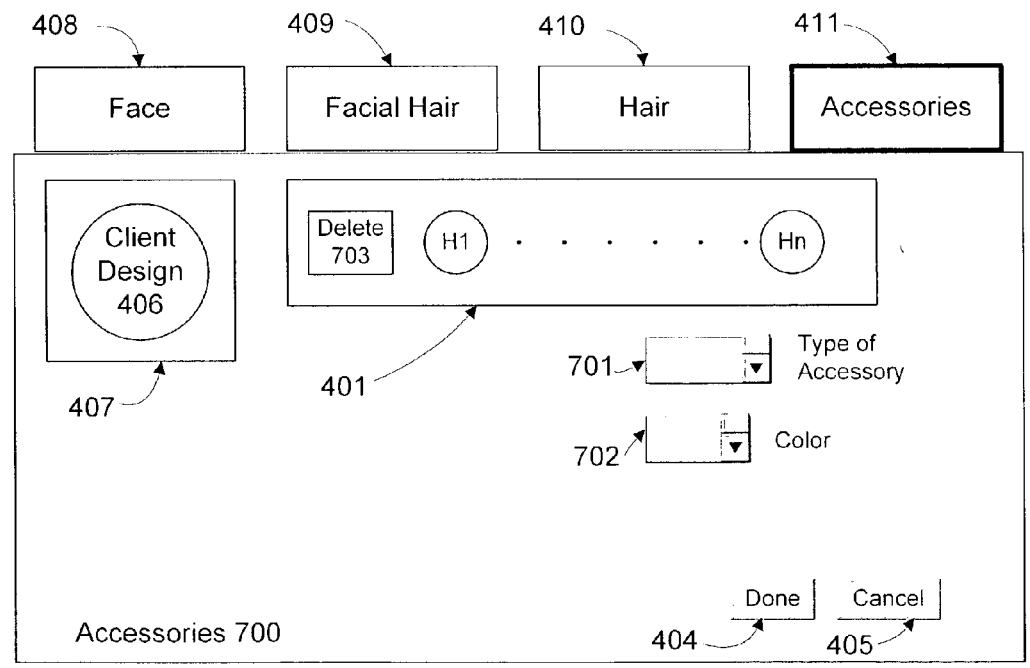
FIG. 7 is a representation of a fourth custom image creation screen.

When the user selects tab 411, accessories screen 700 is displayed, as represented in FIG. 7. In a preferred embodiment, because of the large number and variety of hat styles, hat images are divided into multiple selectable subcategories in menu 701, including baseball, children, holiday, and other. Accessory editing opens, by default, with images of baseball caps. A selection of cap images H1-Hn is initially displayed in options window 401. Other types of accessory images, such as glasses, can be viewed by selecting the desired image type with menu 701. If the user selects an accessory image, the image is incorporated into the composite client design image 406. The color of hats and other accessories is controlled using color menu 702. A previously selected accessory image can be deleted by selecting delete image 703 while the type of accessory image to be deleted is displayed in window 401.

As mentioned above, client design 406 image is a composite image constructed from all of the user's choices. If, for example, the user has constructed a client design image 406 of a bearded male wearing a cap, the image is actually the composite of four separate component images, namely the face, the hairstyle, the facial hair and the hat style, and a separate color selection for each of those four component images. Other image designs could contain more or fewer component images and colors, depending on the choices made by the user. In a preferred embodiment, the combination of the various selected component images and colors to create the composite client design 406 image is performed at server 120 in response to user selections made on screens 400, 500, 600 and 700. Regardless of the order in which components were selected, server 120 enforces positional rules to ensure that the resulting image appears properly. Hair images are placed "on top of" face images, and accessory images are, in turn, placed on top of the face and hair images.

Because the design process may progress in any sequence, the user may complete the image creation process while on screen 400, 500, 600 or 700. Each of these screens, therefore, contains done button 404 allowing the user to indicate that the user is satisfied with the client design image 406. Cancel button 405 is also provided on screens 400, 500, 600 and 700 to allow the user to terminate the image design session. When the user clicks done 404, the system returns the user to template creation screen 300 where the custom client design image 406 is displayed in template 301 at the PI1, PI2 or PI3 location which had been selected by the user for image creation. The user can then select one of the remaining placeholder images to initiate another custom image design session.

When the user has completed the design of all images in the template 301 and has entered all desired text, the design of the elements of the RAL is completed. If the user wishes to modify one of the custom images at this point, the user can click on the desired image and be returned to face screen 400 where the selected image will appear as client design 406 in window 407. The user can then navigate through the editing screens as necessary to perform the desired modification. After any desired change has been made to the image, the user can again click done 404 and return to template creation screen 300. The modified image will appear at the appropriate location in template 301.

Template creation screen 300 also preferably provides functions to allow the user to make changes to template 301 during the template design process. For example, after having initiated a template design session, the user may decide that the selected template is not appropriate because it has either too few or too many images. To add another custom image, the user can click add image button 308. In this example, this would cause template 301 to be modified to have four custom image locations instead of three. All text and custom image information already incorporated into template 301 by the user would be unchanged in the revised template. In a preferred embodiment, the additional custom image would be placed at the right end of the set of images. Alternatively, the system could insert the added image in another location or allow the user to select the point of insertion. To delete an image, the user can select one of the existing images and then click delete image 308. The system will remove the selected image and, in this example, will modify template 301 to contain only two images. Except for the deletion of the image, all text and custom image information already incorporated into template 301 will be unchanged.

A user may sometimes desire to use identical or very similar images, for example in the situation of twins. To save the user the effort of redesigning essentially the same image from the beginning, the user can select an image and click duplicate image button 310. In a preferred embodiment, the result of this action will depend on the status of the images surrounding the image to be duplicated. If, at the time of duplication, a placeholder image is adjacent to the copied image to the right of the copied image, the placeholder image is replaced with the duplicate image. If a custom image is already positioned to the immediate right of the copied image and a placeholder image is adjacent to the copied image to the left of the copied image, the placeholder image is replaced with the duplicate image. If custom images are already positioned to the immediate right and left of the copied image, the duplication request will be treated as a request to increase the number of images by one and the duplicate image will be inserted to the immediate right of the copied image.

When the overall design of template 301 is satisfactory to the user, the user can click done button 310 to complete the template creation process and proceed with the usual order placement and purchase procedure. In a preferred embodiment, system 121 will save the user's custom template 301 design so that the user may return to the site and readily place another order or make modifications.

One preferred embodiment of the invention has been shown and described and various alternative methods and structures for other embodiments have been mentioned, but the foregoing description is to be considered in all aspects as illustrative rather than restrictive. While the system has been described in the context of a client/server application, the invention could be embodied as a computer application for running entirely on a single computer. Custom images could be incorporated into a wide variety of materials intended to be printed on paper, such as business cards, postcards, brochures, letterhead, reports, books and advertising. The invention is not limited to paper products, but could also be readily employed with clothing, promotional goods, and other products constructed of plastic, wood, cloth, glass or any other substrate suitable for printing by any process. Custom images generated according to the invention could also be employed in digital form without printing, such as a screen saver, e-mail attachment, or chat image. The scope of the invention is as indicated in the following claims and all equivalent methods and apparatus.

What is claimed is:

1. A system for designing a custom product containing at least one composite image, the system comprising:
   a server, and
   an image software system loaded on the server, wherein the image software system includes one or more product templates and a plurality of component images, the component images having positional information associated therewith for use by the image software system in positioning multiple component images relative to each other to create a composite image, and one or more design tools configured to download to a client computer and execute in a web browser at the client computer, wherein the image software system is configured to make the component images available for selection by a user of the client computer, allow the user to select one or more subsets of the component images, each subset comprising a plurality of the component images, automatically combine the component images in each subset into a corresponding composite image in accordance with the positional information associated with the component images in the subset, incorporate the one or more composite images into a product template to create a custom product design, and make an image of the custom product design available for displaying to the user at the client computer, wherein the positional information associated with the plurality of component images comprises positional rules which dictate a placement order for placing the component images on top of each other in a composite image.

2. The custom product design system of claim 1 wherein the image software system is further configured to organize the component images into a plurality of categories and to allow the user to select component images from the image categories in any sequence desired by the user.

3. The custom product design system of claim 2 wherein each category of images has an associated identifier of the position of images in that category relative to images in the other categories and wherein the image software system is configured to automatically create the composite image by combining at least the subset of selected component images in accordance with their associated category position identifiers independent of the sequence in which the subset of component images was selected by the user.

4. The custom product design system of claim 1 wherein the image software system is further configured to enable the user to select individual component image colors for least a portion of the component images in the composite image.

5. The custom product design system of claim 1 wherein the image software system is further configured to, in response to a user command, create a duplicate of a custom composite image previously created by the user and incorporate the duplicate into the product template such that the composite image appears at least twice in the product design.

6. The custom product design system of claim 5 wherein the image software system is further configured to automatically reposition at least the composite image in the custom product design when the duplicate image is incorporated.

7. The custom product design system of claim 1 wherein the image software system is further configured to allow the user to modify the composite image by adding one or more additional component images to the subset.

8. The custom product design system of claim 1 wherein the image software system is further configured to allow the user to modify the composite image by deleting one or more previously selected component images from the subset.

9. The custom product design system of claim 1 wherein the image software system is Thither configured to allow the user to modify the composite image by simultaneously deleting one or more previously selected component images from the subset and adding one or more component images to the subset.

10. The custom product design system of claim 1 wherein at least one of the one or more product templates is capable of containing a plurality of composite images and wherein the image software system is further configured to allow the user to select a desired number of composite images to be incorporated into the custom product design and to display at least one product template configured to have the selected number of composite image locations.

11. The custom product design system of claim 10 wherein the image software system is further configured to insert an additional composite image location into the custom product design and to reposition the composite images in the custom product design to accommodate the inserted composite image location.

12. The custom product design system of 10 wherein the position of each composite image location in the product template is indicated to the user by a placeholder image.

13. The custom product design system of claim 12 wherein the image software system is further configured to, in response to a user request delete a placeholder image from the-product template and insert a composite image in the product template at the location previously occupied by the deleted placeholder image.

14. The custom product design system of claim 13 wherein the image software system is further configured to delete a composite image selected by the user from the custom product design and to reposition any remaining composite images in the custom product design.

15. The custom product design system of claim 10 wherein the image software system is further configured to delete a composite image location from the custom product image and to reposition remaining composite image locations in the custom product image.

16. The custom product design system of 1 wherein the image software system is further configured to allow the user to enter text that is not contained in any component image for incorporation into the product design.

17. The custom product design system of claim 16 wherein the image software system is further configured to allow the user to enter text associated with each composite image in the custom product design and to automatically incorporate the text entered by the user into the product design at a position that is near the position in the product design of the composite image associated with the text.

18. The custom product design system of claim 1 wherein the image software system is further configured to display a current composite image area displaying at least the current composite image created by combining the current subset of component images and to display at least one component image option area displaying one or more component images available for selection by the user.

19. The custom product design system of claim 18 wherein the system is further configured to insert the composite image from the current composite image area into a custom product image upon user request.

20. The custom product design system of claim 1 wherein the image software system is further configured such that selection of the subset of component images in a predetermined sequence is not required.

21. The custom product design system of claim 1 wherein the composite image is a composite image depicting a caricature of at least a portion of a person.

22. The custom product design system of claim 1 wherein the component images include at least a plurality of human face images and a plurality of human hairstyle images.

23. The custom product design system of claim 22 wherein the component images further include at least a plurality of hat images and a plurality of eyeglass images.

24. A computer-implemented method, executed by one or more processors, for enabling a user to incorporate one or more composite images into a product template to create a custom product design, the method comprising the steps of:
   a) displaying on a user's display a plurality of categories of component images, each category having information associated therewith for use in positioning the component images in that category relative to images in other component image categories,
   b) in response to selection of a first image component category, displaying on the user's display a plurality of component images in the first category,
   c) in response to selection of an image in the first category, displaying on the user's display the selected component image as the current composite image for user review,
   d) in response to selection of another image category, displaying on the user's display a plurality of component images in the newly selected category,
   e) in response to selection of an image in the newly selected category, using at least one processor to automatically combine the current composite image with the selected image from the newly selected category in accordance with at least the positional information associated with the categories of the selected images to produce a revised composite image and presenting on the user's display the revised composite image as the current composite image for user review,
   f) if yet another image category is selected, repeating steps (d) and (e), and
   g) if the user indicates that the user has completed the composite image, incorporating the composite image into the product template to create a custom product design and displaying on the user's display the custom product design containing the custom design image for user review.

25. The method of claim 24 further comprising repeating steps (a)-(g) such that the custom product design contains a plurality of composite designs.

26. The method of claim 25 further comprising allowing the user to place an order for the production of one or more products from the custom product design.

27. The method of claim 24, wherein the positional information comprises positional rules which dictate a placement order for placing the component images on top of each other in a composite image.

28. The method of claim 24 wherein all of the steps are performed by a processor.

29. One or more computer readable storage media having stored therein a custom product design program configured to run in a server computer operatively connected to a client computer, the server having at least one stored product template and a plurality of stored images, the images having positional information associated therewith for use by the program in positioning multiple images relative to each other to create a composite image, and the client computer having a display device and a user data input device, the program comprising:
   program code for making a plurality of component images available to the client for selection,
   program code, responsive to a first selection input from the client computer, for retrieving a selected component image,
   program code, responsive to at least one additional selection input from the client computer, for retrieving at least one additional selected component image,
   program code for automatically combining all selected component images in accordance with the positional information associated with the selected images into a composite image, wherein the positional information comprises positional rules which dictate a placement order for placing the component images on top of each other in a composite image,
   program code for incorporating the composite image into a product template to create a custom product design, and
   program code for making the custom product design containing the composite image available to the client computer.

30. The one or more computer readable storage media of claim 29 further comprising program code for allowing the user to place an order for the production of one or more products from the custom product design.

31. One or more computer readable storage media having stored therein a computer program, which when executed on a client computer, is configured to enable the user of the client computer to develop a custom product design containing one or more composite images, the client computer having a display device and a data input device and being connected to a server having one or more stored product templates and a plurality of stored component images, the component images having positional information associated therewith for use by the program in positioning multiple component images relative to each other to create a composite image, the program comprising:
   program code for receiving and displaying a plurality of component images from the server,
   program code for receiving a plurality of component image selection inputs from the user,
   program code for identifying the selected component images to the server, and
   program code for receiving from the server and displaying a custom product design, the custom product design being a product template having incorporated therein at least the composite image resulting from the combining of at least alt selected images in accordance with the positional information associated with the selected images, wherein the positional information comprises positional rules which dictate a placement order for placing the component images on top of each other in a composite image.

32. The one or more computer storage readable media of claim 31 further comprising program code for allowing the user to place an order for the production of one or more products from the custom product design.

* * * * *